US011317352B2

(12) United States Patent
Jangid et al.

(10) Patent No.: US 11,317,352 B2
(45) Date of Patent: Apr. 26, 2022

(54) METHOD AND SYSTEM FOR MOBILITY MEASUREMENTS IN NEW RADIO (NR) BASED MOBILE COMMUNICATION NETWORK

(71) Applicant: Samsung Electronics Co., Ltd., Suwon-si (KR)

(72) Inventors: Alok Kumar Jangid, Bangalore (IN); Arijit Sen, Bangalore (IN); Kailash Kumar Jha, Bangalore (IN); Nishant, Bangalore (IN); Jagadeesh Gandikota, Bangalore (IN); Koustav Roy, Bangalore (IN); Lalith Kumar, Bangalore (IN); Siva Selvaganesan, Bangalore (IN); Mudit Goel, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 189 days.

(21) Appl. No.: 16/857,777

(22) Filed: Apr. 24, 2020

(65) Prior Publication Data

US 2020/0344694 A1     Oct. 29, 2020

(30) Foreign Application Priority Data

Apr. 26, 2019 (IN) .............................. 201941016746
Jul. 11, 2019 (IN) .............................. 201941027738
Apr. 17, 2020 (IN) .............................. 202044016656

(51) Int. Cl.
*H04W 52/02* (2009.01)
*H04W 24/10* (2009.01)
(Continued)

(52) U.S. Cl.
CPC ........ *H04W 52/0274* (2013.01); *G06N 20/00* (2019.01); *H04B 7/088* (2013.01);
(Continued)

(58) Field of Classification Search
CPC . H04W 52/0274; H04W 24/10; H04W 36/06; H04W 36/30; H04W 36/32;
(Continued)

(56) References Cited

U.S. PATENT DOCUMENTS 9,282,581 B2    3/2016 Cui et al.
2010/0185575 A1    7/2010 Martin Lopez et al.
(Continued)

FOREIGN PATENT DOCUMENTS

EP        3 448 114 A1    2/2019
WO       2018/190689 A1   10/2018

OTHER PUBLICATIONS

Vodafone Group, General Requirements of RAN-Centric Data Collection and Utilization for LTE and NR, Sep. 28, 2018, 3GPP TSG-RAN WG3 #101bis, R3-185826, Chengdu, China.
(Continued)

*Primary Examiner* — Hassan Kizou
*Assistant Examiner* — Abdullahi Ahmed
(74) *Attorney, Agent, or Firm* — Jefferson IP Law, LLP

(57) ABSTRACT

A method for performing mobility-measurements in new radio (NR) based 3GPP mobile communication network is provided. The method includes receiving network information with respect to a geographical area from one or more user equipments (UEs) operating in geographical area for a predefined duration of time. The received network information is classified at various time-instants during the predefined duration of time as at least one of an NR spectrum availability and NR spectrum non-availability. An overall probability of availability of the NR spectrum within the area is calculated for a time-instant subsequent to the predefined duration of time based on the classified network
(Continued)

information. The UE is enabled for scheduling NR measurements within the area based on the calculated probability.

19 Claims, 20 Drawing Sheets

(51) Int. Cl.
| | |
|---|---|
| *H04W 64/00* | (2009.01) |
| *H04W 36/36* | (2009.01) |
| *H04W 36/32* | (2009.01) |
| *H04B 7/08* | (2006.01) |
| *H04W 36/30* | (2009.01) |
| *G06N 20/00* | (2019.01) |
| *H04W 36/06* | (2009.01) |
| *G01S 3/02* | (2006.01) |
| *H04W 88/06* | (2009.01) |

(52) U.S. Cl.
CPC ........... *H04W 24/10* (2013.01); *H04W 36/06* (2013.01); *H04W 36/30* (2013.01); *H04W 36/32* (2013.01); *H04W 36/36* (2013.01); *H04W 64/00* (2013.01); *G01S 3/02* (2013.01); *H04W 88/06* (2013.01)

(58) Field of Classification Search
CPC ..... H04W 36/36; H04W 64/00; H04W 88/06; H04W 64/003; H04W 36/00835; H04W 36/0085; H04W 48/16; H04W 88/02; G06N 20/00; H04B 7/088; H04B 7/0695; G01S 3/02; Y02D 30/70
See application file for complete search history.

(56) References Cited

U.S. PATENT DOCUMENTS

| | | | |
|---|---|---|---|
| 2017/0041900 A1* | 2/2017 | Wallentin | H04W 68/02 |
| 2019/0394718 A1* | 12/2019 | Nimbavikar | H04W 28/16 |
| 2020/0100315 A1* | 3/2020 | Jia | H04W 52/0235 |
| 2020/0137819 A1* | 4/2020 | Shi | H04W 52/365 |
| 2020/0296569 A1* | 9/2020 | Kumar | H04L 67/303 |
| 2021/0045177 A1* | 2/2021 | Lee | H04W 76/18 |

OTHER PUBLICATIONS

Fraunhofer Iis, Overview of Potential NR Positioning Technologies, Sep. 28, 2018, 3GPP TSG RAN WG1 Meeting #94bis, R1-1811459, Chengdu, China.

Huawei et al., Discussion on Big Data and 5G, Jan. 26, 2018, SA WG2 Meeting #125, SG-181250, Gothenburg, Sweden.

Orange et al., New Key Issue: Recommendations Produced by NWDAF, Jul. 6, 2018, 3GPP TSG-SA WG2 Meeting #128, S2-187166, Vilnius, Lithuania.

Suresh Kumar et al., Handover forecasting in 5G using machine learning, Aug. 3, 2020, International Journal of Engineering & Technology, pp. 76-79.

International Search Report dated Aug. 13, 2020, issued in International Application No. PCT/KR2020/005480.

European Search Report dated Feb. 3, 2022, issued in European Application No. 20796450.3.

* cited by examiner

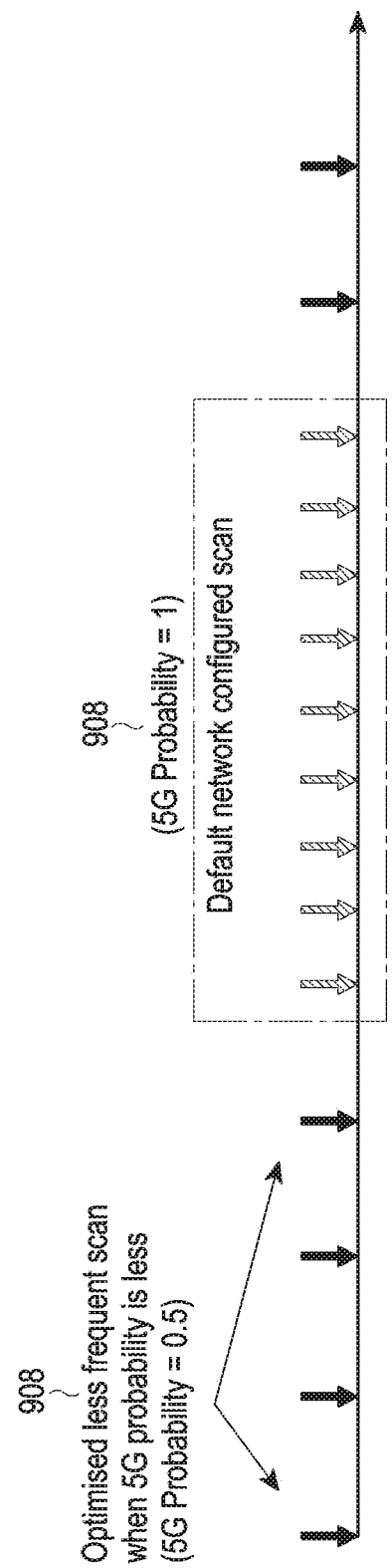

METHOD AND SYSTEM FOR MOBILITY MEASUREMENTS IN NEW RADIO (NR) BASED MOBILE COMMUNICATION NETWORK

CROSS-REFERENCE TO RELATED APPLICATION(S)

This application is based on and claims priority under 35 U.S.C. § 119(a) of an Indian Provisional patent application Serial number 201941016746, filed on Apr. 26, 2019, in the Indian Intellectual Property Office, of an Indian Provisional patent application Serial number 201941027738, filed on Jul. 11, 2019, in the Indian Intellectual Property Office, and of an Indian Complete patent application Serial number 202044016656, filed on Apr. 17, 2020, in the Indian Intellectual Property Office, the disclosure of each of which is incorporated by reference herein in its entirety.

BACKGROUND

1. Field

The disclosure relates to wireless tele-communication networks. More particularly, the disclosure relates to techniques for managing the network availability.

2. Description of Related Art

In long term evolution (LTE) based telecommunication networks, master information blocks and system information blocks, such as master information block (MIB), system information block1 (SIB1), SIB2 are broadcast within the cells as a part of providing necessary parameters to complete cell selection for user equipments (UEs). As may be known, the LTE cell broadcasts as defined by the information block SIB2 including plmn-InfoList-r15, if the wireless telecommunication standard as followed is $5^{th}$ generation (5G) in the LTE cell area. The same indicates that the UE or the end-user device may get access to 5G communication standard based service in a cell or area. As a part of indication to the user-equipment, the mobile network operators (MNO) prefer displaying 5G indicator in the area where 5G based service holds available.

In an example, a non-standalone evolved universal terrestrial radio access new radio (E-UTRA-NR) dual connectivity device (i.e., NSA EN-DC device) displays "5G Basic" technology indicator upon the screen of the user-device, when the EN-DC device is in the LTE cell (either as camped cell in radio resource control (RRC) Idle state, or as LTE PCell in RRC Connected state). The same is accomplished by inclusion of parameter plmn-InfoList-r15 IE in SIB2, i.e., upperLayerIndication-r15 set as TRUE.

FIGS. 1A and 1B illustrate constraints with respect to state-of-the-art 5G networks according to the related art.

Referring to FIGS. 1A and 1B, the network in a particular cell indicates 5G support via the block SIB2 and a DCNR bit is also allowed as per subscription (in the broadcast message ATTACH ACCEPT/TAU ACCEPT). In such a scenario, while the UE may avail 5G service in that area, however the same still remains a probability and is not guaranteed. Accordingly, to mitigate the risks, the UE is forced to keep 5G stack ON, thereby enhancing overall power consumption and an overhead. When the UE is not present in 5G area, network may configure measurements for finding 5G coverage. This will consume power, if the UE is not in 5G area then these measurements are un-necessary. Even if the UE has moved out of 5G coverage area, then also the UE keeps measurement ON. The present scenario has been depicted diagrammatically through a state-of-the-art 5G network in FIG. 1A.

As further indicated in FIG. 1B, when a user is travelling or staying at any particular location, the UE will register and access different networks (3rd generation (3G), 4th generation (4G), 5G, Wi-Fi etc.). In initial deployments, availability of 5G is based on ENDC. LTE coverage is very large compared to NR and there are chances that the UE is under a LTE cell which has NR cell but can never be connected. If the UE is performing NR measurements under this cell it is very much power consuming as the UE is not present under NR coverage.

Yet another issue often plaguing the state-of-the-art 5G networks is that when the UE is not present in 5G area, then the UE is still configured to conduct measurements for finding 5G coverage, thereby consuming power. If the UE is not within a 5G broadcast area, then such measurements prove un-necessary. Overall, the constraint is that despite the UE moving out of 5G coverage area, the UE keeps on undertaking the 5G measurements and remains on a look-out for 5G network coverage. The present scenario has been depicted diagrammatically through a state-of-the-art 5G network in FIG. 2.

FIG. 2 illustrates a constraint with respect to state-of-the-art 5G networks according to the related art.

Referring to FIG. 2, yet another issue as often encountered is the scenario wherein the UE has been initially in the 5G coverage area and EN-DC mode is active. As the UE moves away from the 5G area, a radio-link failure (RLF) is reported at a new radio (NR) cell, and the UE continues the NR measurements. The present scenario has been depicted diagrammatically through a state-of-the-art 5G network in FIG. 3.

FIG. 3 illustrates a constraint with respect to state-of-the-art 5G networks according to the related art.

Referring to FIG. 3, as per experimentally-conducted studies, an average of 320 mA of power-consumption is realized when the UE is performing NR cell measurement. In contrast, an average of 130 mA of power consumption is realized when the UE is not performing NR cell measurement.

Accordingly, there lies a need of obviating aforesaid drawbacks plaguing the state-of-the-art 5G networks and the UE.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a user equipment (UE) information regarding the $5^{th}$ generation (5G) network availability and accordingly turning ON/OFF the 5G stack based on the network availability information.

Additional aspects will be set forth in part in the description which follows and, in part, will be apparent from the description, or may be learned by practice of the presented embodiments.

In accordance with an aspect of the disclosure, a method for performing mobility-measurements in new radio (NR)

based $3^{rd}$ generation partnership project (3GPP) mobile communication network is provided. The method includes receiving network information with respect to a geographical area from one or more UEs operating in the geographical area for a predefined duration of time. The received network information is classified at various time-instants during the predefined duration of time as at least one of an NR spectrum availability and NR spectrum non-availability. Thereafter, an overall probability of availability of the NR spectrum within the area is calculated for a time-instant subsequent to predefined duration of time based on the classified network information. The UE is enabled for scheduling NR measurements within the area based on the calculated probability.

In accordance with another aspect of the disclosure, a method implemented in the UE for fetching 5G area availability at least based on Geo-fencing is provided. The method includes utilizing the current location information as have been captured through one or more of the UE application. Further, based on determination of the 5G cell locations, a 5G coverage radius may be approximated based on frequency bands FR1 or FR2 coverage. The UE checks if the information regarding current location is within the 5G coverage area or near 5G coverage boundary. The location information is then communicated to a modem/application processor (AP) within the UE, based on which the 5G stack is activated selectively. The 5G stack is maintained active as long as the UE lies in proximity of the 5G coverage.

In accordance with another aspect of the disclosure, a method of fetching 5G area availability based on Big Data and artificial intelligence (AI) concept is provided. The 'Big data' server collects the data from multiple devices and applies a predictive-analysis (e.g. AI) based criteria to detect the 5G area. Big data & AI decides the 5G locations and shares with device. Based on that shared information, the UE checks if current location is within 5G coverage area or nearby 5G coverage boundary. Based on the ascertainment, the UE informs Modem that in turn triggers a 5G stack to turn it ON/OFF based upon the current location information.

At least by virtue of aforesaid, the claimed subject matter addresses the problems in state-of-the-art 5G based telecommunication networks through at least relying upon one or more of Geo-fencing, Big Data and artificial intelligence (AI) and accessing information regarding the availability of 5G network in the vicinity of the UE. As a result, the 5G stack is allowed to be selectively turned ON/OFF depending on proximity to the 5G coverage or near 5G coverage area information, thereby advantageously saving the power consumption by the 5G stack.

In accordance with another aspect of the disclosure, a method for transmission reception beam (Tx-Rx) pair selection in 3GPP mobile communication network is provided. The method includes accessing a pre-stored beam information by a UE in respect of one or more locations. The beam information is stored and classifiable as at least one of cell details, beam pair details, usage information, route details. Upon visit to a location by the UE, the UE is configured to switching onto a particular transmission reception beam pair (Tx-Rx) based on the accessed beam information. A transmission reception beam direction is predicted with respect to the location based on at least one of previous Tx/Rx beam direction, an amount of displacement of the UE from previous visited location, and a direction of the current location relative to previous location.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunctions with the accompanying drawings, in which:

FIGS. 9A and 9B illustrate radio frequency (RF) Scan optimizations by a UE according to various embodiments of the disclosure;

Throughout the drawings, like reference numerals will be understood to refer to parts, components, and structures.

DETAILED DESCRIPTION

Figure 1A:
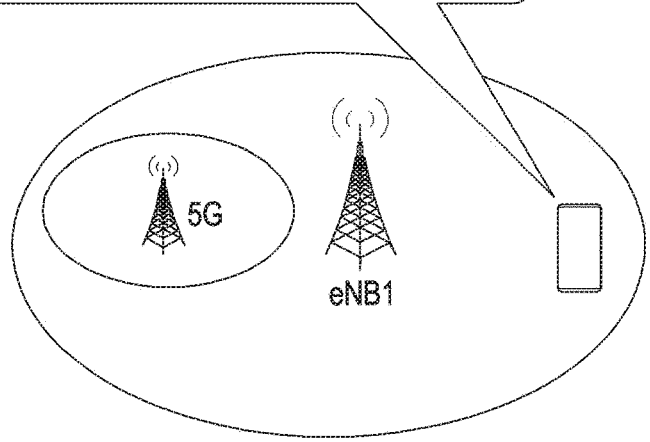
FIGS. 1A and 1B illustrate constraints with respect to state-of-the-art $5^{th}$ Generation (5G) networks according to the related art.
Figure 1B:
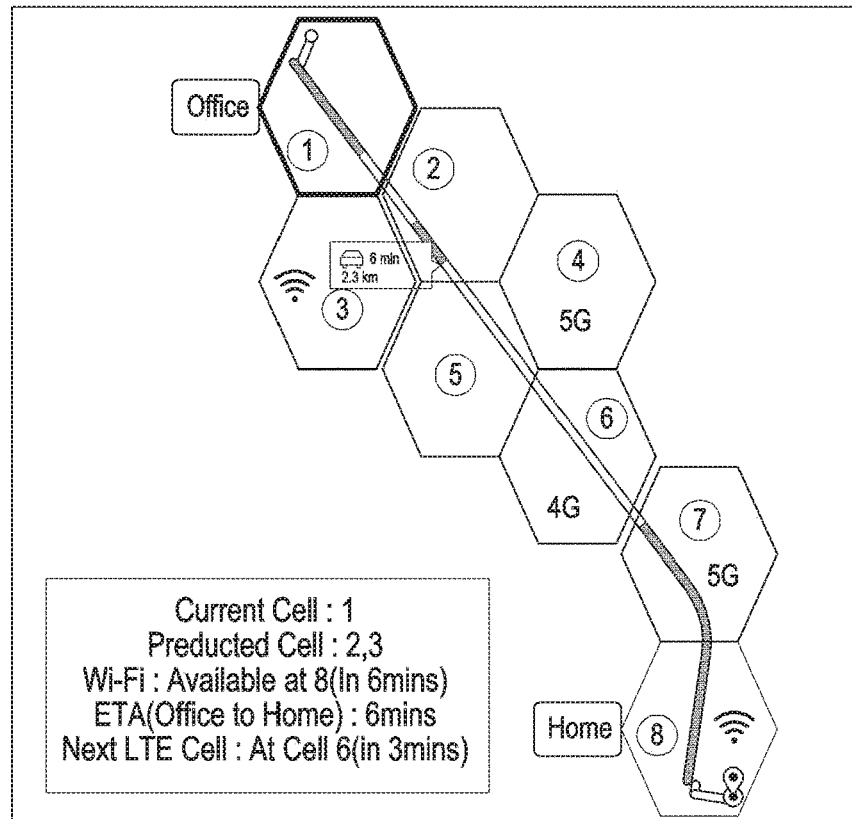
Figure 2:
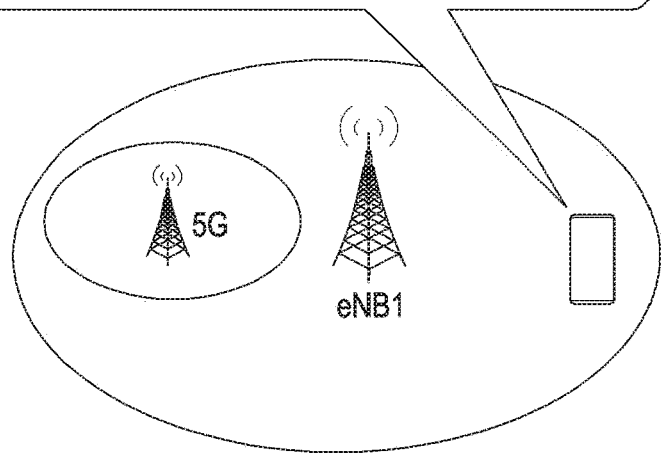
FIG. 2 illustrates a constraint with respect to state-of-the-art 5G networks according to the related art.
Figure 3:
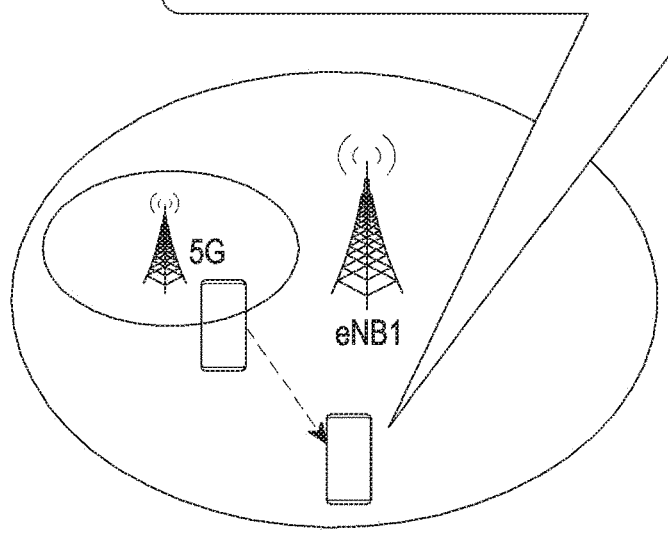
FIG. 3 illustrates a constraint with respect to state-of-the-art 5G networks according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this disclosure belongs. The system, methods, and examples provided herein are illustrative only and not intended to be limiting.

The disclosure relates to wireless communication network, which renders the flexibility to a UE to selectively turn ON/OFF the 5G modem stack based upon the availability of 5G networks in vicinity.

Figure 4A:
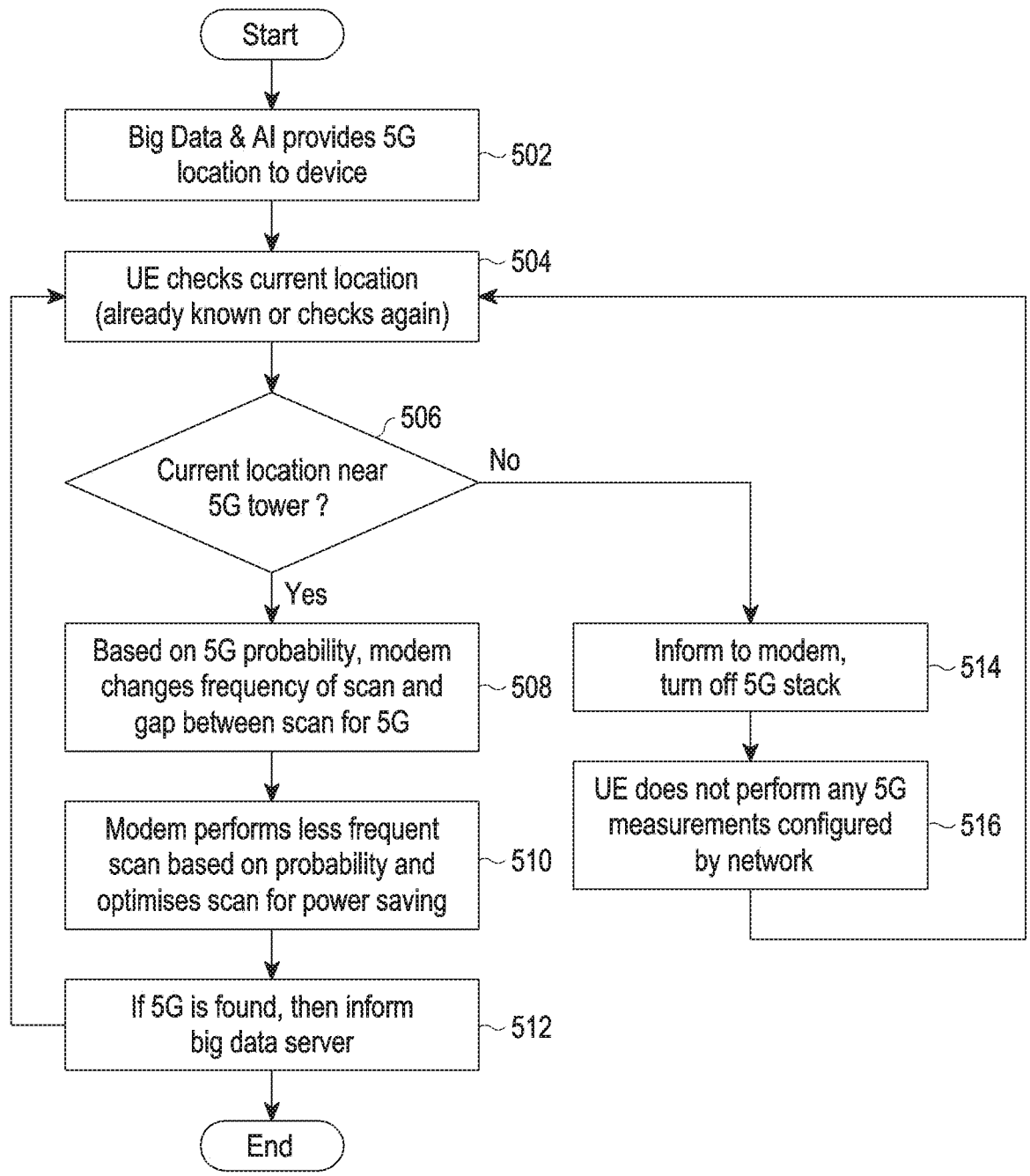
FIG. 4A illustrates a method for furnishing 5G network availability information according to an embodiment of the disclosure.

FIG. 4A illustrates a method for performing mobility-measurements in new radio (NR) based 3GPP mobile communication network according to an embodiment of the disclosure.

Referring FIG. 4A, the present method relates to furnishing 5G network availability information, in accordance with another embodiment of the present subject matter. Specifically, there is provided a method of furnishing 5G area availability using Big Data and artificial intelligence (AI).

Operation 502 refers a Big data Server collects data from multiple devices and applies AI/machine learning (ML) to detect 5G area. Big data & AI/ML decides 5G locations and shares with device.

The present operation 502 corresponds to receiving operation 502a network information with respect to a geographical area from one or more UEs operating in the geographical area for a predefined duration of time. In an implementation, the network information corresponds to a physical cell identifier (PCI) for at least one of a 4G cell and a 5G cell, an SIB2 indicator, a 5G Cell signal information, a UE location, public land mobile network (PLMN) info, Second cell group (SCG) failure info, Beam information, and 5G cell count in a track area identifier (TAI).

At operation 502b, the method comprises classifying at 502b the received network information at various time-instants during the predefined duration of time as at least one of: an NR spectrum availability and NR spectrum non-availability. In an implementation, the classifying comprises processing the received information over a period of time by a cloud server based on machine-learning criteria to classify the location as at least one of a 5G network and 4G network based.

At operation 502c, the method comprises calculating an overall-probability of availability of the NR spectrum within the area for a time-instant subsequent to predefined duration of time based on the classified network information. In an implementation, the calculating comprises identifying a density of 5G cells in 4G cell with respect to the location based on clustering-criteria. The clustering criteria is defined by classifying received network information into one or more 5G cell clusters.

Operation 504 refers the UE receiving 5G area geographical-locations and the calculated probability from the server for the current location of the UE. The UE checks current location and provides 5G probability information to an in-built modem.

At operation 506, it is checked at the UE if there is some probability of getting 5G and network has configured measurement. At operation 508, the modem changes frequency of scan and gap between scan for 5G as otherwise set as per default arrangement.

At operation 510, the modem performs less frequent scan based on probability. At operation 512, If 5G is found, then the UE inform big data-server.

However, at operation 506, if the probability of getting 5G is NULL or minimum, then at operation 514 the modem keeps 5G stack off. As a result, at operation 516, the modem does not perform any measurement.

In an implementation, the receiving operation 502a of the network information, the classifying operation 502b of the received network information and the computing operation 502c of the probability is executed by either a mobile management entity (MME) forming a part of the communication network (LTE-4G) or an access and mobile management function (AMF) node forming a part of the communication network (5G-NR). Accordingly, the computed-probability the MME or the AMF is communicated to the UE for enabling the UE to schedule the NR measurements.

Further, at least one of the receiving operation 502a of network information the classifying operation 502b of the received network information and the computing of probability operation 502c causes the network entity (say MME or AMF) forming a part of a core communication network to control a base station (gNB) through adjustment of NR measurements configuration parameters and thresholds based on the computed probability. Likewise, the management of NR measurement configurations at the base station (gNB) is also based on the computed probability.

In yet another implementation, the network information is received at operation 502a, and classified (502b) by a network entity. The network entity comprises a 4 g core network, 5 g core network, eNodeB, gNodeB, and network function blocks. The network entity calculates at operation 502c the overall probability of the NR spectrum within the area based on the classified network information, and modifies the NR measurements configuration parameters and thresholds for the at least one UE based on the computed probability.

In other implementation, the steps, such as receiving operation 502a of network information, classifying operation 502b of the received network information, and computing of probability at operation 502c cause the network entity to: adjust NR measurements configuration parameters and thresholds based on the computed probability; manage NR measurement configurations based on the computed probability.

Figure 4B:
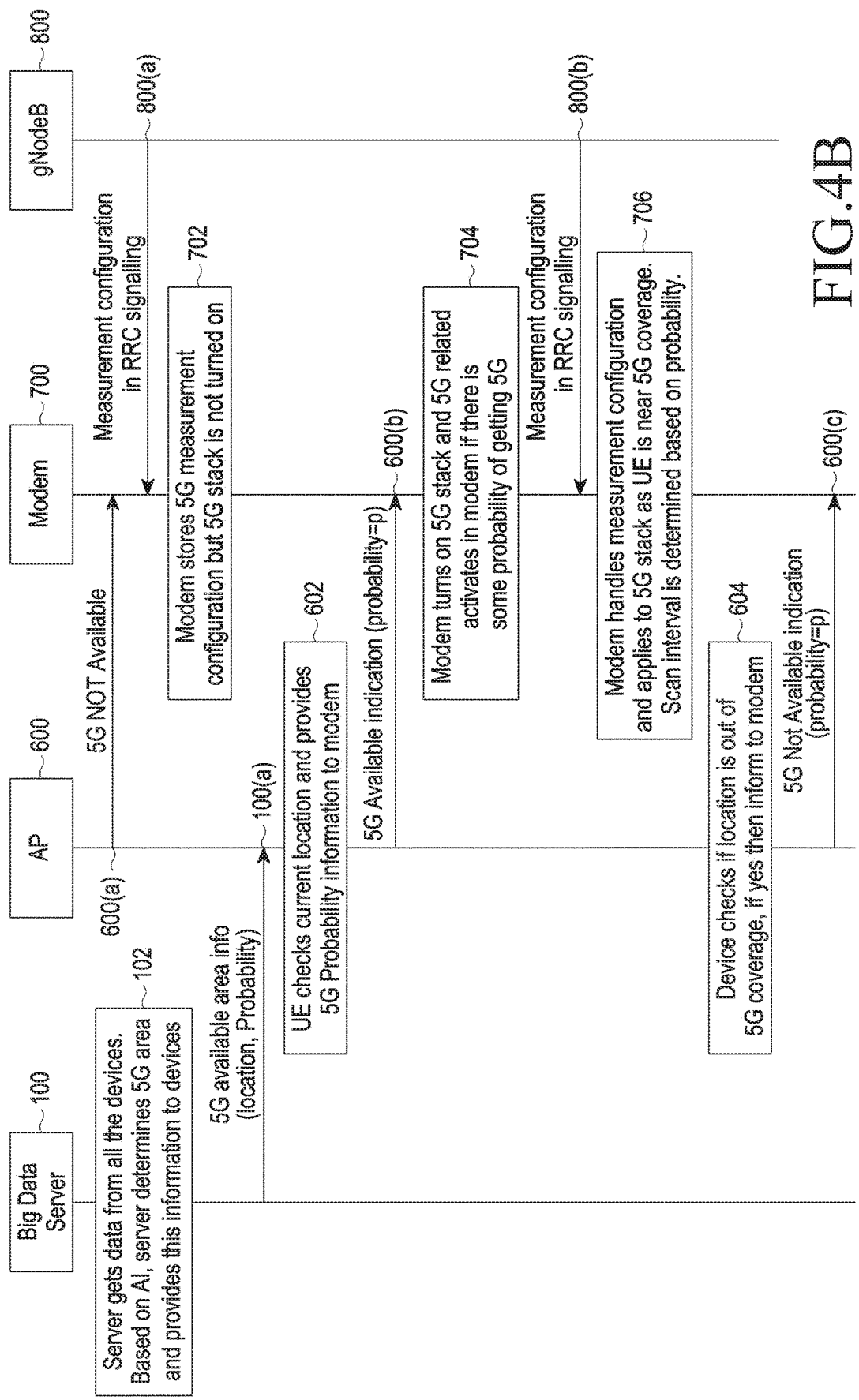
FIG. 4B illustrates a method for furnishing 5G network availability information between AP, modem, and gNodeB according to an embodiment of the disclosure.

Referring FIG. 4B, elaborated method for furnishing 5G network availability information is illustrated through an interaction between Big Data server 100, AP 600, modem 700 and gNodeB 800, in accordance with an embodiment of the present subject matter and accordingly refers the process operations 502 till 516 of FIG. 4A according to an embodiment of the disclosure. The Big Data server 100 may be a mobile edge computing server or a remote cloud server.

Operation 102 illustrates the Big Data server 100 getting data from all the devices and correspond to operation 502. Based on AI, the Big Data server 100 determines 5G area and provides this information to devices. The same corresponds to the method operation 502. Accordingly, a signaling operation 100(a) illustrates the transmission of signal from Big Data server 100 to AP 600 regarding the 5G area information and corresponds to operation 504.

Operation 602 illustrates the AP 600 of the device checking if location is in 5G coverage and accordingly corresponds to the method operation 506. If the answer is yes, then AP 600 informs the modem 700 about 5G availability via the signaling operation 600(b). If the answer is no, then AP 600 informs the modem 700 about 5G non-availability via the signaling operation 600(a) and 600 (c).

Operation 702 illustrates the modem 700 storing 5G measurement configuration but not turning ON 5G stack, and accordingly corresponds to the operations 514 and 516.

Operation 704 illustrates the modem 700 turning on 5G stack and 5G related activities in modem (ex. 5 g measurement), and accordingly corresponds to the operations 508 and 510.

Operation 706 illustrates the modem 700 handling measurement configuration and applying to 5G stack as the UE is near 5G coverage and accordingly corresponds to the operation 512. In operation 604, the AP device checks if location if out of 5G coverage.

Operations 800(a) and 800(b) illustrate the measurement configuration as a part of standard RRC signal from gNodeB 800 to the modem 700.

Overall, as 5G will get deployed only in certain areas, devices or UEs which are in 5G area keeps reporting Information to Big data server about 5G coverage and location. Based on server data base and AI, the server creates 5G available area information. 5G availability information is shared by the server to the UE. Device can use this information for turning 5G and performing 5G measurements.

Figure 5:
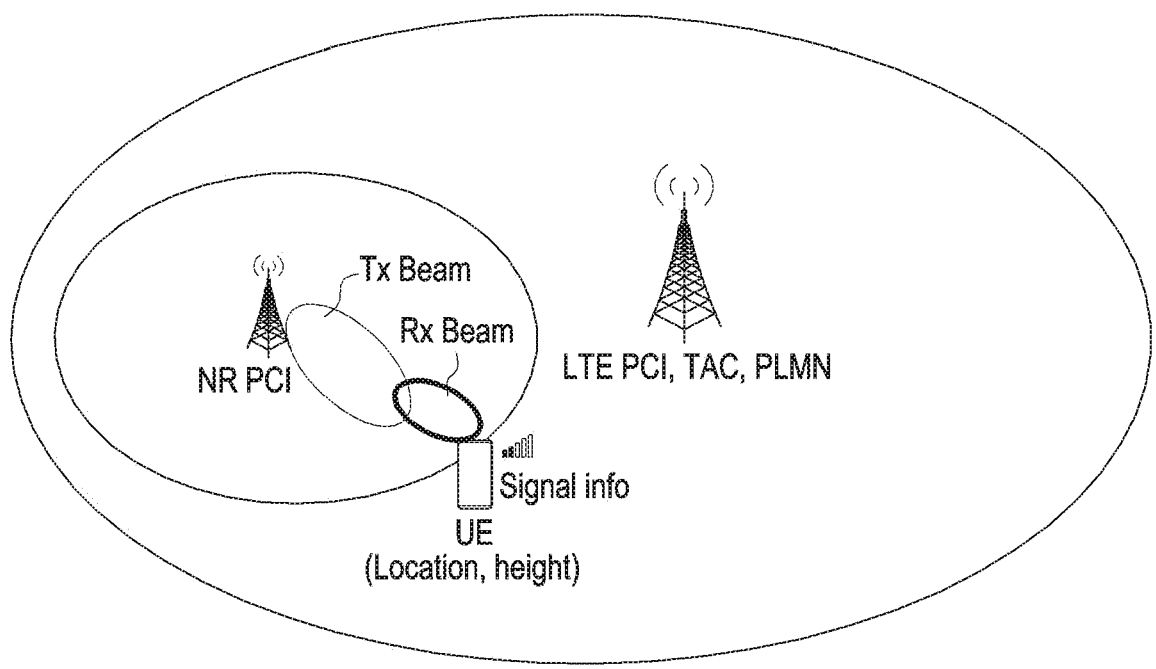
FIG. 5 illustrates signaling-data parameters according to an embodiment of the disclosure.

FIG. 5 illustrates data parameters according to an embodiment of the disclosure.

Referring FIG. 5, these parameters represented in Table 1 correspond to the signaling data (defined as per 3GPP standards) collected by the server during operation 502a. More specifically, Table 1 corresponds to the type of received information which is classified at operation 502b at different time-instants as corresponding to either NR spectrum availability or non-availability.

TABLE 1

| Parameter | Description |
| --- | --- |
| 4G Cell PCI | 4G Cell PCI information |
| 5G Cell PCI | PCI information for 5G gNB |
| SIB2 indicator | 5G availability in the 4G cell |
| 5G Cell signal information | RSRP, RSRQ, Pathloss, Tx Power |
| UE location | GPS location |
| PLMN info | MCC, MNC, TAI |
| SCG failure info | Failure cause, Event A2 for the serving NR cell etc. |
| Beam information | Tx/Rx Best beam index (CSI-RS, SS/PBCH), Beam direction, Code book index |
| 5G cell count in TAI | Number of 5G cells present in a TAI |

Figure 6:
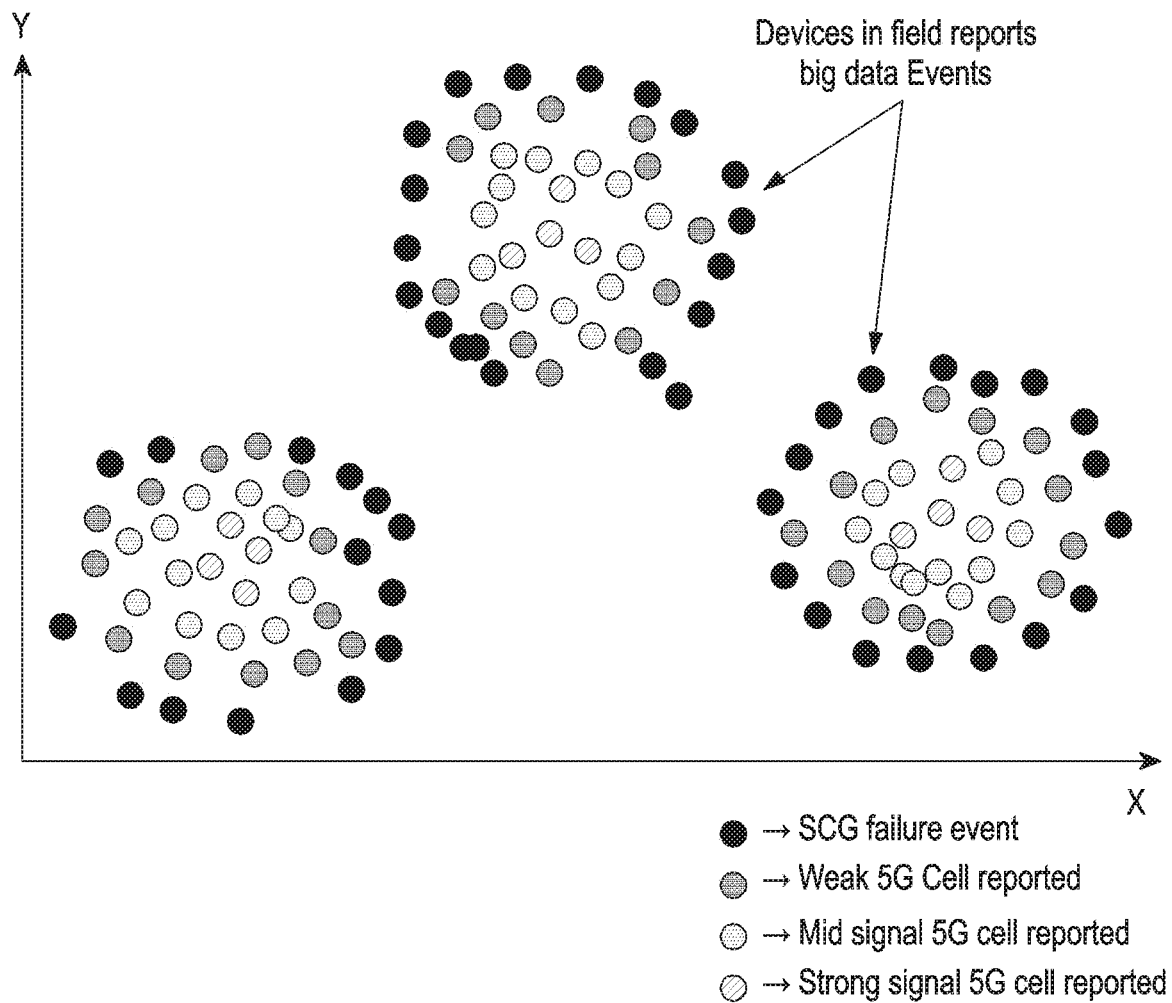
FIG. 6 illustrates reporting by devices to a server according to an embodiment of the disclosure.

FIG. 6 illustrates reporting by devices to a server according to an embodiment of the disclosure.

Referring to FIG. 6, reporting by devices, such as the UE to the server as per operation 502a is illustrated, and accordingly indicates devices in field reporting big data events. In an example, the events may be "SCG failure" event, "Weak 5G Cell" reported, "Mid signal 5G cell" reported, and "Strong signal 5G cell" reported according to an embodiment of the disclosure.

Figure 7:
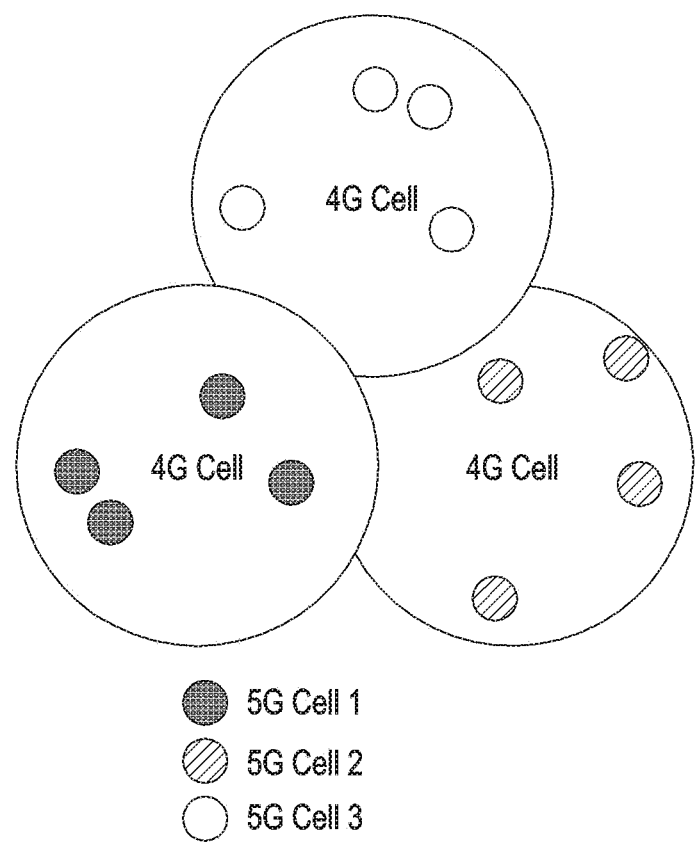
FIG. 7 illustrates a procedure to determine 5G locations according to an embodiment of the disclosure.
Figure 8:
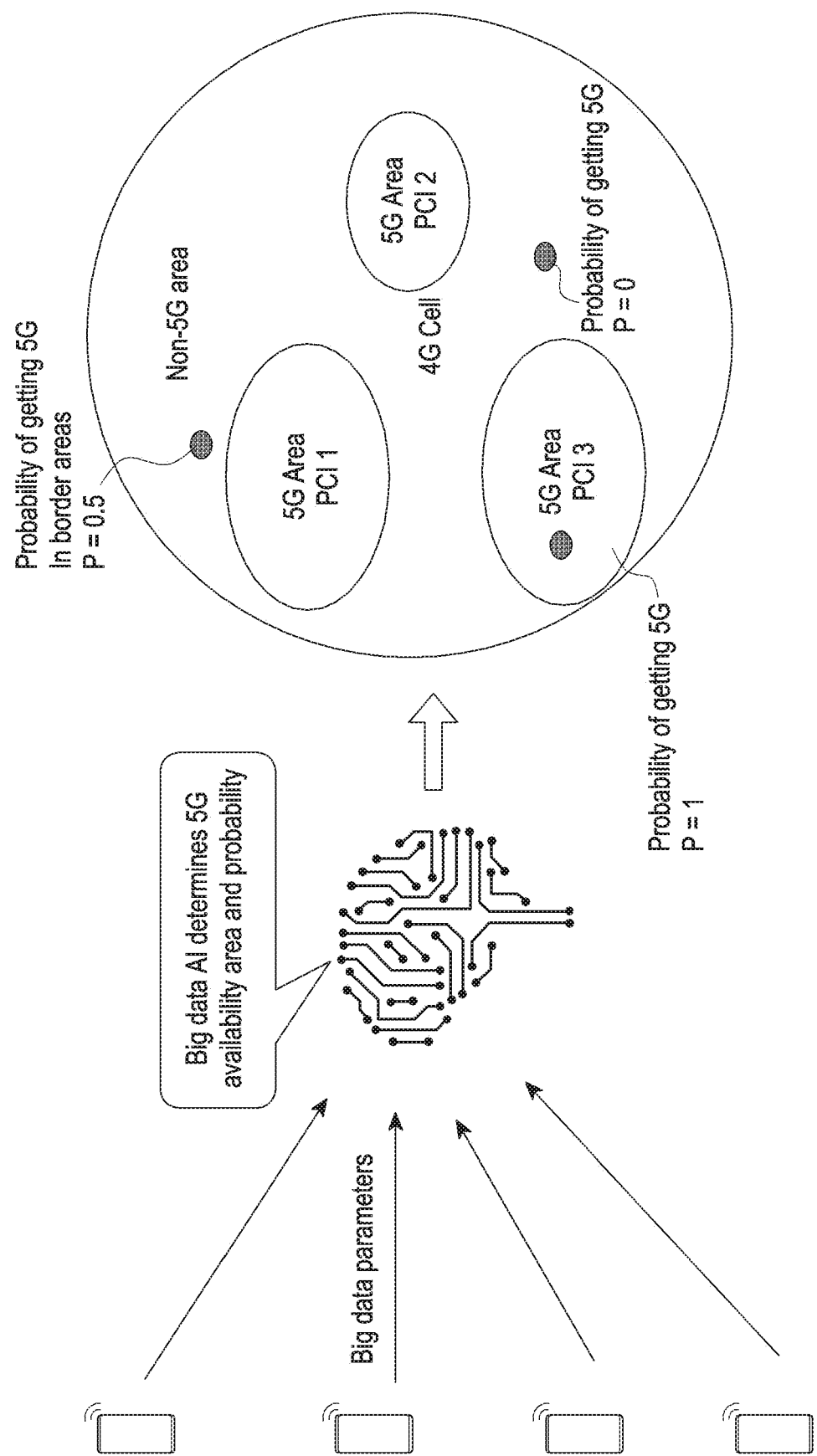
FIG. 8 illustrates computation of probabilities by server according to an embodiment of the disclosure.

The forthcoming description of FIG. 7 and FIG. 8 refer an example illustration of the "Classification of areas as NR availability/NR non-availability" of a given area into 5G or non-5G areas at least based on the network information of Table 1. Such classification is derived at least based on the classification operations 502b and further computation of probabilities (i.e., operation 502c) that numerically quantifies the probability of done classification. Overall, operations 502b and 502c conjointly represent the classification "Classification of areas as NR availability/NR non-availability"

FIG. 7 illustrates a procedure to determine 5G locations according to an embodiment of the disclosure.

Referring to FIG. 7, a procedure to determine 5G locations is illustrated and accordingly correspond to server operation with respect to operation 502b, according to an embodiment of the disclosure.

In an example, using K-Means Clustering algorithm, density of 5G cells in 4G cell can be identified. Clustering will partition data into groups of similar points (here 5G cells). Clustering will be created based on global positioning system (GPS) coordinates and SIB2 indicator, signal strength and other data accessed from Big Data parameters.

To identify a 5G cell cluster region, for all the N GPS points, each GPS point "$x_i$" may be assigned to one of the K clusters to identify 5G cells presence. That means a cluster whose center is closest to the GPS point is represented by:

$$C(i) = \underset{1 \leq k \leq K}{\operatorname{argmin}} \|x_i - m_k\|^2, \, i = 1, \ldots, N$$

Thereafter, the cluster means $m_k$ is updated $$m_k = \frac{\sum_{i:C(i)=k} x_i}{N_k}, k = 1, \ldots, K.$$

Based on an integration of above two assignment and updating steps, the 5G cells cluster (5G Cell 1, 5G Cell 2, 5G Cell 3) is obtained. Based on this probability of finding 5G cells is derived.

FIG. 8 illustrates computation of probabilities by server according to an embodiment of the disclosure.

Referring to FIG. 8, the server computing numerical probabilities in accordance with operation 502c based on the classification of operation 502b is illustrated.

More specifically, the Big Data AI operating in the server determines 5G locations. The Big data AI determines 5G availability area and a resultant probability as 0, 0.9, 0.5 etc for different areas or PCI areas in a 4G cell. As shown, within the 5G Area PCI, the probability of accessing 5G services is 1. However, outside the PCI, the probability is 0 and remains 0.5 at the boundaries of PCI.

Figure 9A:
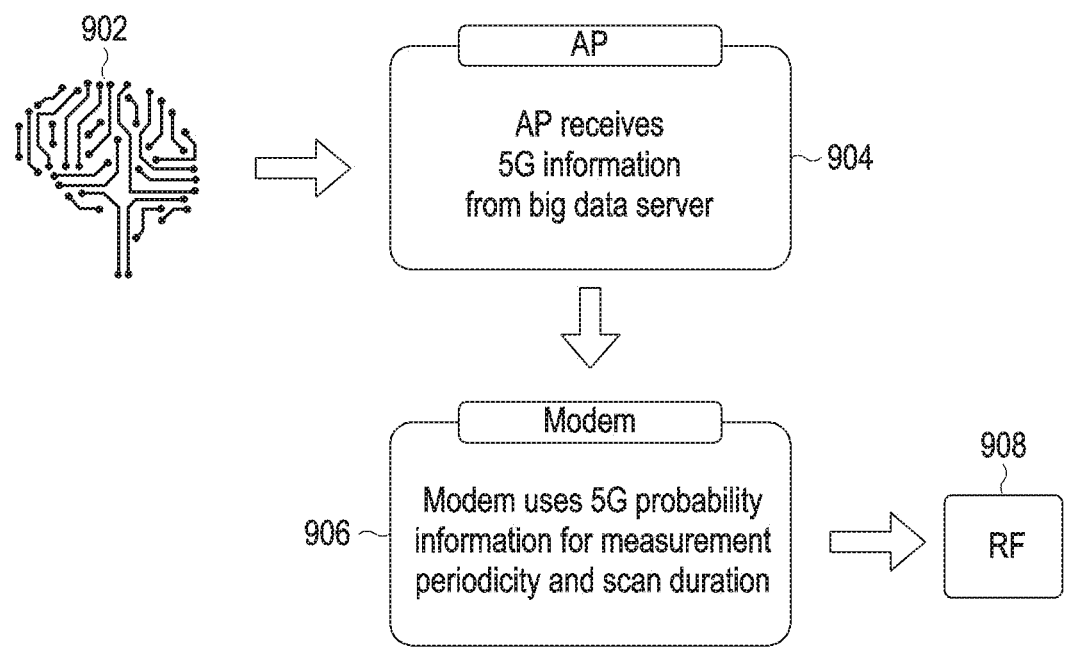

FIGS. 9A and 9B illustrate RF-Scan optimization by a UE according to various embodiments of the disclosure.

Referring to FIGS. 9A and 9B, at operation 902, the Big Data server determines 5G locations and probability in accordance with operations 502a till 502c.

At operation 904, the UE receives 5G area locations and probability from server in accordance with operations 504. The UE checks current location and provides 5G possibility to modem in accordance with operation 506.

At operation 906, based on 5G probability, modem changes frequency of scan and gap between scan for 5G in accordance with operations 508 and 510.

At operation 908, the RF measurements are controlled by both modem and Big data intelligence at the server for optimization. In an example, as further indicated, when 5G probability is less say 0.5, then less frequent scan is performed. However, when 5G probability is high say 0.99, then normal or default network configured scan is performed.

At least based on aforesaid, the UE can be provisioned with 5G area and 5G probability information using below alternate methods:

a) The UE can get location map along with 5G probability for the given area/city. The UE can check its current location and fetch probability information from pre-loaded map.

b) The UE can query to server at periodic interval for getting 5G related information around area where device is present.

c) After losing 5G coverage, device sends query to the server for getting 5G information around that area.

d) In Standalone (SA) mode, when 4G neighbor information broadcast 5G information, then the UE can send query to server for finding 5G availability information.

e) After airplane mode on/off or power on or operating system (OOS) recovery, the device checks with server for getting 5G information. 5G availability information can be send to device periodically from the server as PUSH information. If server has device location information using some method, then server can PUSH the information based on device location.

Overall, the 5G Information can be given by another nearby device using device to device (D2D) technology. If device is connected with Wi-Fi then it can request server to provide 5G information.

Figure 10A:
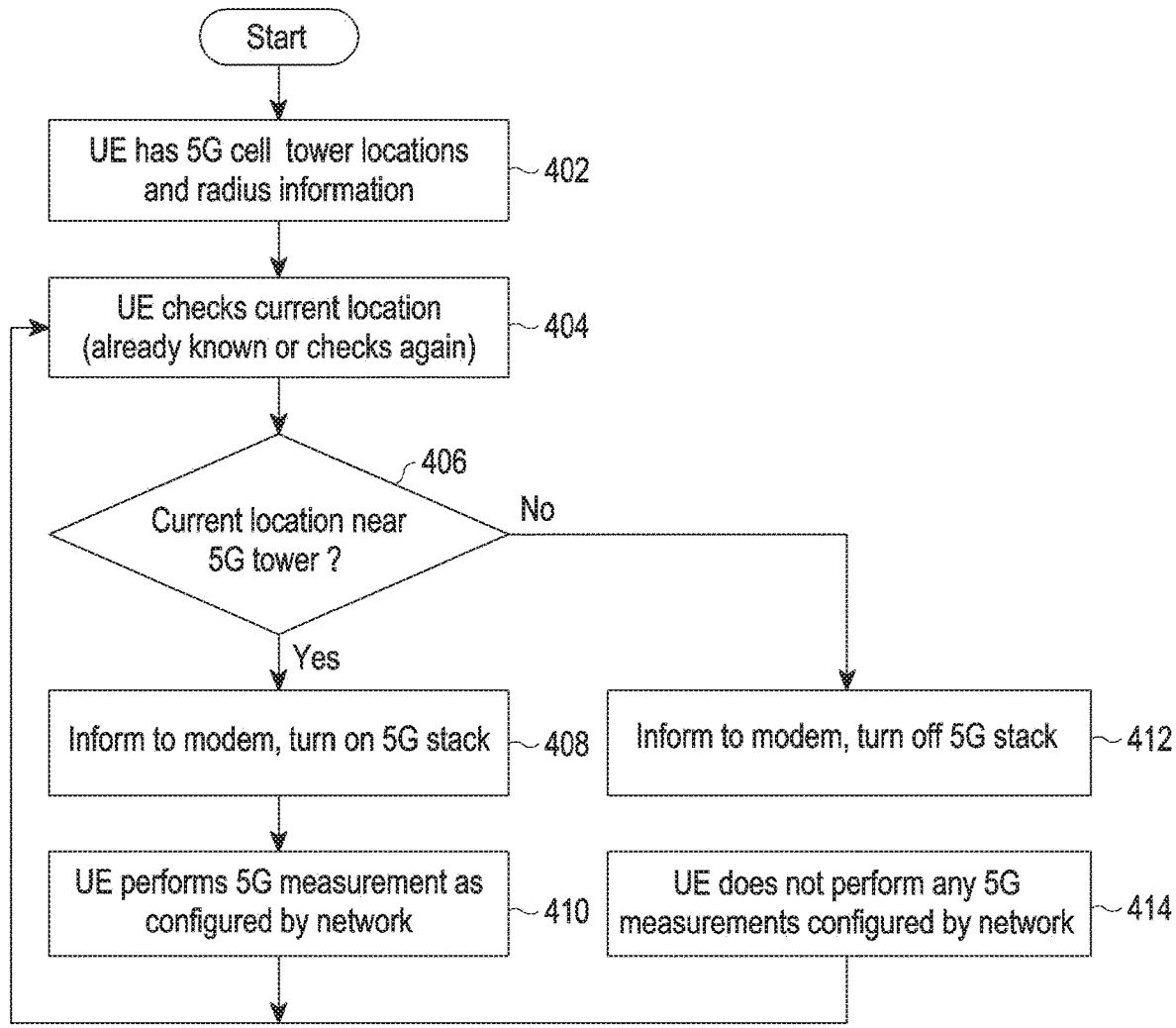
FIG. 10A illustrates a method for furnishing 5G network availability information according to an embodiment of the disclosure.

FIG. 10A illustrates a method for furnishing 5G network availability information according to an embodiment of the disclosure.

Referring to FIG. 10A, operation 402 illustrates the UE accessing the apps for determining the current location of the device. The same refers to determining new radio (NR) cell locations corresponding to a current-location of a mobile-device at least based on an online-geographical map.

Operation 404 illustrates ascertaining, based on the known 5G cell locations, an approximate 5G coverage radiuses based on frequency bands FR1 or FR2 coverage. The same refers to computing an extent of NR coverage associated with current-location based on an availability of with at least one of a first frequency range (FR1) and a second frequency range (FR2) for telecommunication by the UE. The computing corresponds to operation 502b. Accordingly, a UE is enabled at scheduling NR measurements within the area based on ascertaining if the UE is within or nearby the NR coverage.

Operation 406 illustrates the UE checking if the current location is within 5G coverage area or near 5G coverage boundary.

Operation 408 illustrates the informing the current location aligned with 5G coverage areas (if the answer to operation 406 is yes) to modem and turn on 5G stack. The Modem or AP processor within the UE activates 5G modem, and maintains it active.

Operation 410 illustrates the Modem/AP processor activating 5G stack, and performing 5G measurement as configured by network.

Operation 412 illustrates determining that the UE is not in proximity of 5G coverage, if answer to the operation 406 is NO, thereby turning OFF the 5G stack.

Operation 414 illustrates the device or the UE not performing any NR measurement, as device knows that it's out of 5G coverage. This state is maintained even if network configures 5G measurements.

Figure 10B:
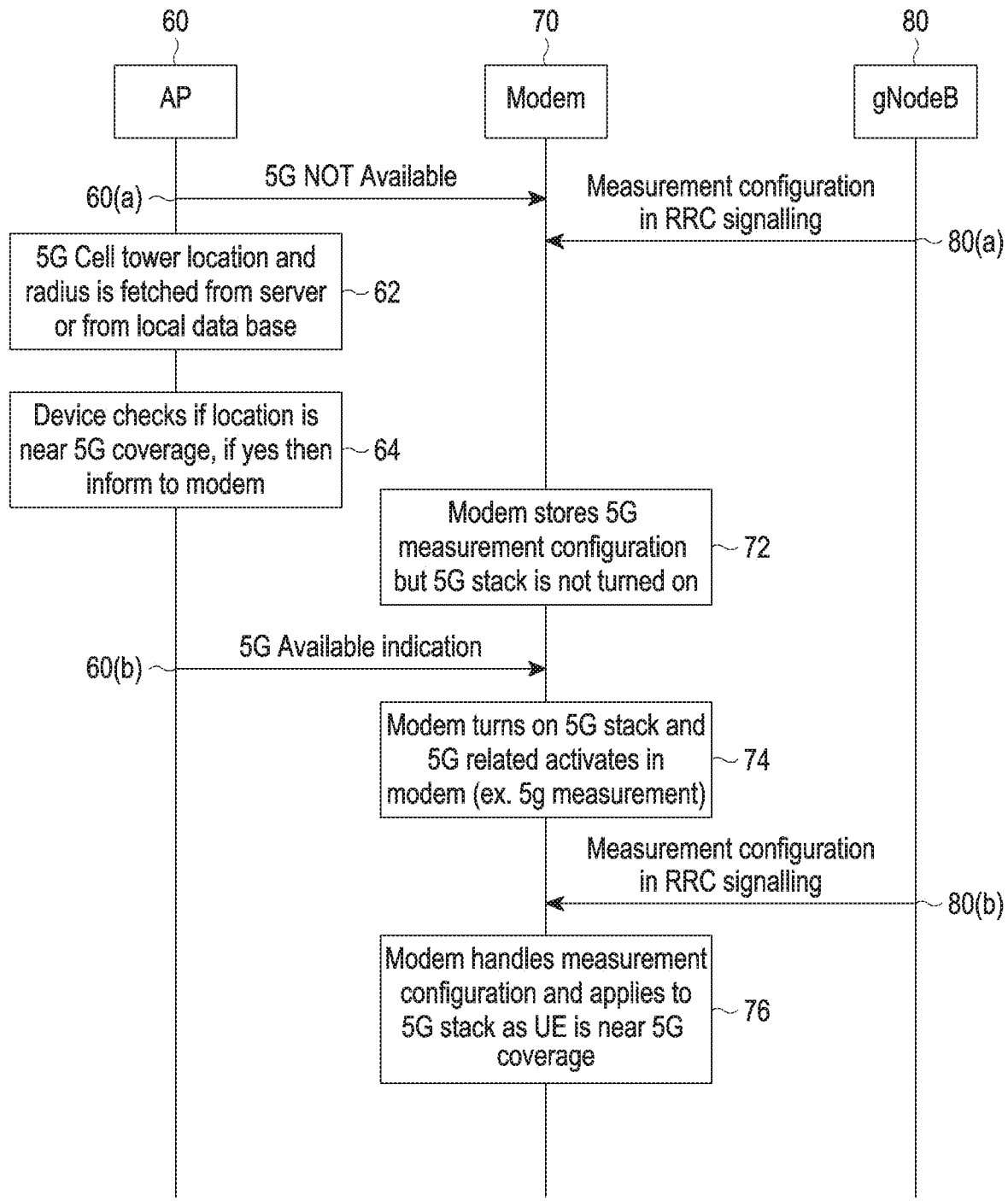
FIG. 10B illustrates a method for furnishing 5G network availability information through an interaction between AP, modem, and gNodeB according to an embodiment of the disclosure.

FIG. 10B illustrates elaborated method for furnishing 5G network availability information through an interaction between an AP (60), a modem (70), and a gNodeB (80) according to an embodiment of the disclosure.

Referring to FIG. 10B, operation 62 executed by the AP (60) illustrates fetching 5G Cell tower location and radius from server or from local data base, thereby corresponding to the combination of the method operation 402 and operation 404.

Operation 64 executed by the AP (60) illustrates AP (60) checking if location is near 5G coverage, thereby corresponding to the method operation 406. If the answer is yes, then AP (60) informs the modem (70) about 5G availability via the signaling operation 60(b). If the answer is no, then AP (60) informs the modem (70) about 5G non-availability via the signaling operation 60(a).

Operation 72 illustrates the modem (70) storing 5G measurement configuration but not turning ON 5G stack and accordingly corresponds to the operations 412 and 414.

Operation 74 illustrates the modem (70) turning on 5G stack and 5G related activates in modem (e.g. 5 g measurement) and accordingly corresponds to the operations 408 and 410.

Operation 76 illustrates the modem (70) handling measurement configuration and applies to 5G stack as UE is near 5G coverage.

Operations 80(a) and 80(b) illustrate the measurement configuration as a part of standard RRC signal from gNodeB (80) to the modem (70).

Overall, through the present embodiment, the present method furnishes 5G area availability information to the UE using Geo-fencing. Based on the identification of the 5G cell locations, the UE detects the current location and based thereupon analyses if the device is already in 5G coverage area or not. In an example, in android based operating systems, the geo-fencing APIs are available to check the device current location. Accordingly, in the present example, the location information is at least determined through the Android, thereby enabling the UE to use this location information to determine if the device is located within 5G available area or not.

Overall, the present embodiment facilitates the devices already in 5G area at reporting information to Big data server about 5G coverage and location. Based on the server database and AI, the server creates a 5G available area information. The 5G availability information is shared by big data server with the device. The device can further use this information for turning ON 5G stack modem and performing 5G measurements.

At least by virtue of aforesaid features, the present subject matter at least renders various salient features in respect of the present subject matter as follows:

The 5G stack remaining OFF when the UE is not in 5G coverage or near 5G coverage area.

In real time, the UE learns the 5G availability and keeps on updating its data base.

The location information that is already available in the AP of device is ascertained from the app and accordingly used for determine the network coverage.

Usage of Big data & AI help in sharing location information to device and 5G availability.

At least by virtue of aforesaid, the present subject matter achieves an efficient power saving as 5G stack is kept OFF during un-availability of 5G networks i.e., the UE does not perform un-necessary measurements when the UE is aware that it's not in 5G coverage proximity. The solution as rendered may be applied, for example in multi-random access technology (RAT) (MR)-DC architecture options and SA mode with respect to 5G wireless communication standard and the other analogous standards.

Overall, at least by virtue of aforesaid, 5G Coverage is determined from 5G tower location or Big data analysis. As per state of the art, 5G Coverage is determined with RF measurements. In contrast to the state-of-the-art triggered RF measurement consuming 150~180 mA for finding location, the GPS merely consumes approx. extra 30~50 mA for finding location 150~180 mA. Further, scan interval and frequency are optimised based on probability of getting 5G and network measurement configuration.

The embodiments as depicted aforesaid at least yield the following advantages:

1. 5G stack is kept turned off when the UE is not in 5G coverage (probability is 0).
2. The UE keeps learning based on 5G availability and updates its data base.
3. Location information is already available in Modem AP associated with the UE.
4. Big data & AI may help in sharing location information to device and 5G availability.
5. Power is saved as 5G stack is kept off, and the UE does not perform un-necessary measurements when the UE is aware that it's not in 5G coverage proximity.
6. Scan-interval and scan-duration are optimised based on probability of getting 5G.
7. Applicability in MR-DC architecture options and SA mode.

Figure 11:
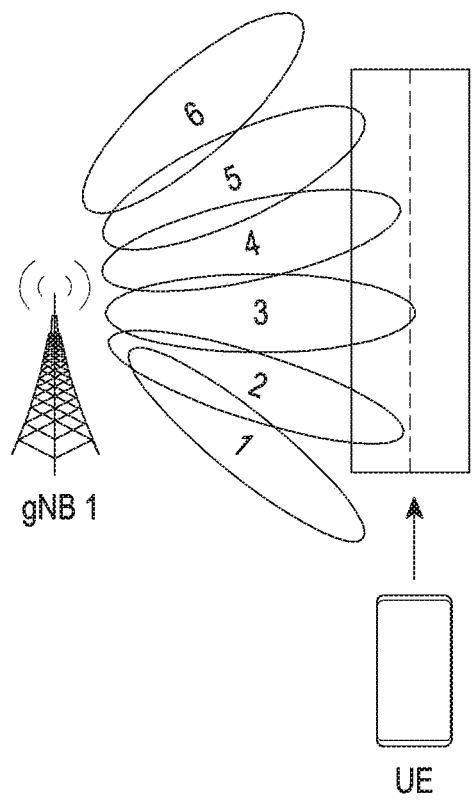
FIG. 11 illustrates a prior-art illustrating a performance of beam measurement according to an embodiment of the disclosure.

FIG. 11 illustrates a state-of-the-art performance of beam measurement according to an embodiment of the disclosure.

Referring to FIG. 11, if the UE does not have any Tx beam information or any assistance information from gNB (medium access control (MAC)-control element (CE)), the UE has to continuously perform exhaustive beam searching and choose the best beam/beams. This process is battery inefficient and time taking (causing higher latency). In an example, the situation turns worse in case of Ultra Reliable Low Latency (URLLC) scenarios.

If the UE is in idle mode i.e., no network assistance to switch beam ids or transmission configuration indicator (TCI) state information from MAC CE, then it's up to the UE implementation how it will camp on to or choose the correct beam id. In worst case scenario the UE will have to perform an exhaustive search to camp on to correct Tx and Rx beam. This is a high power consuming procedure and latency of selecting correct beam is also high. Moreover, if the UE does not have any information of selecting beam id then it has to perform exhaustive search.

Overall, the selection of correct beam not only depends upon current serving cell, it will also depend upon the current UE location within that cell. The selection of current beam also depends upon rotation or position of the UE at x, y and z axis. The state-of-the-art is at least plagued with the problem as to how the UE will handle if it finds the learned beams have temporary blockage or not satisfying reference signal receive power (RSRP)/reference signal received quality (RSRQ) or signal-to-interference-plus-noise ratio (SINR) criteria.

Figure 12A:
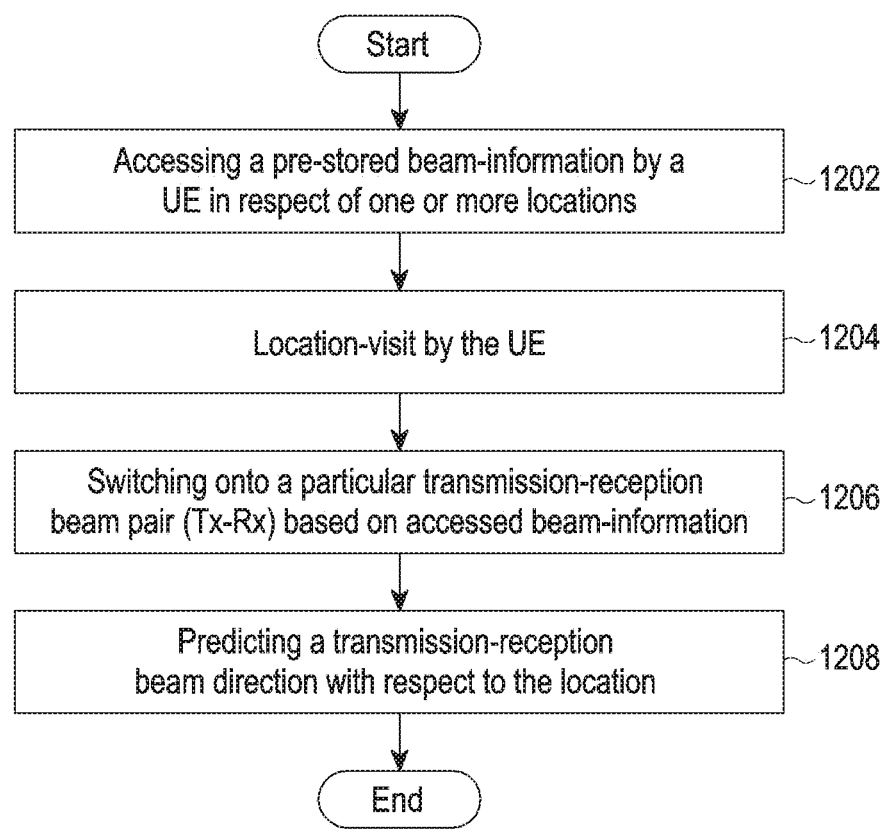
FIGS. 12A and 12B illustrate methods for transmission reception beam (Tx-Rx) pair selection in $3^{rd}$ generation partnership project (3GPP) mobile communication network according to various embodiments of the disclosure.
Figure 12B:
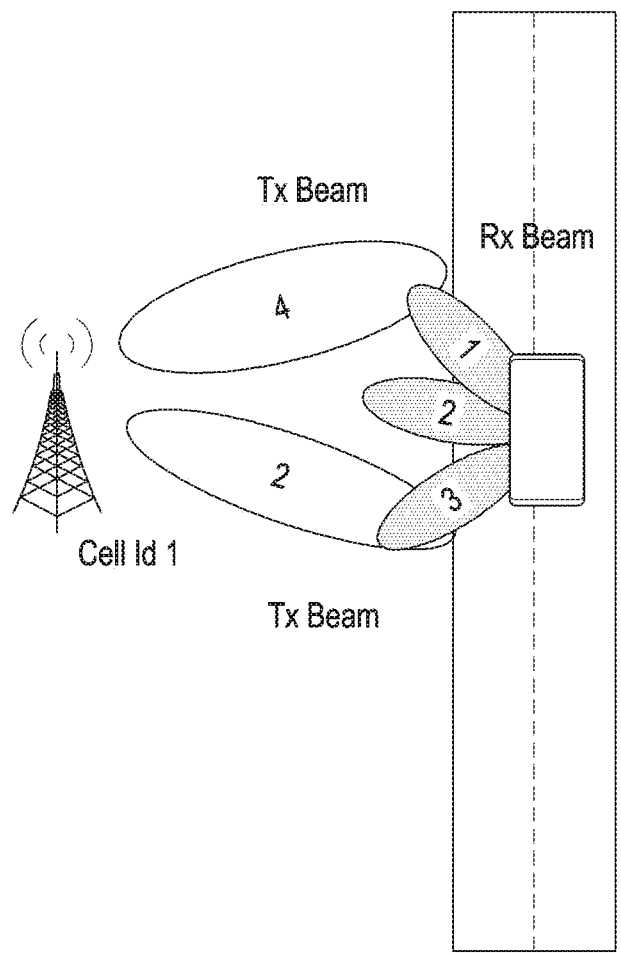

FIGS. 12A and 12B illustrate methods for transmission reception beam (Tx-Rx) pair selection in 3GPP mobile communication network according to various embodiments of the disclosure.

Referring to FIGS. 12A and 12B, the method comprises accessing operation 1202 a pre-stored beam information by a UE in respect of one or more locations. More specifically, the accessing operation 1202 comprises storing operation 1202*a* a plurality of beam information with respect to a serving beam by a UE in respect of one or more locations and location-visit by the UE in operation 1204. Thereafter, the stored beam information is classified at operation 1202*b* as at least one of cell details, beam pair details, usage information, route details. Upon visit to a location by the UE, the method further comprises switching operation 1206 onto a particular transmission reception beam pair (Tx-Rx) based on the accessed beam information. Optionally, the method additionally comprises predicting operation 1208 a transmission reception beam-direction with respect to the location based on at least one of previous Tx/Rx beam direction, an amount of displacement of the UE from previous visited location, and a direction of the current location relative to previous location.

Referring to FIG. 12B, the UE will learn the beam ids for particular PCIs. The UE will select best beam based on the learning information. The UE will save battery and reduce latency by not performing exhaustive beam search operation.

In an example, if the UE is following same route everyday (e.g. home to office or office to home) and it learns:
the serving cell id/ids at each location within its route,
serving cell plmn id/ids, serving cell frequency (e.g. 39 GHz or 28 GHz and so on),
Tx beam id/ids (best "n" Tx beam ids per each serving cell),
Tx Beam direction, Rx Beam id/ids (best "m" Rx beam ids corresponding to each Tx beam id),
Rx Beam directions knows the beam direction (e.g. 120 degrees or 60 degrees), The UE can find the correct beam id or switch Tx and Rx beam pair very swiftly compared to the existing procedures. For example, if the UE can figure out based on learning for cell id 1 possible best Tx beam ids will be 2, 3 and 4 and corresponding best Rx Beam will be 3, 2 and 1 respectively at the current UE location and orientation (x, y and z axis position of the UE), the UE can only search those beams and camp on any one of those beams based on RSRP/RSRQ or SINR values.

Figure 13:
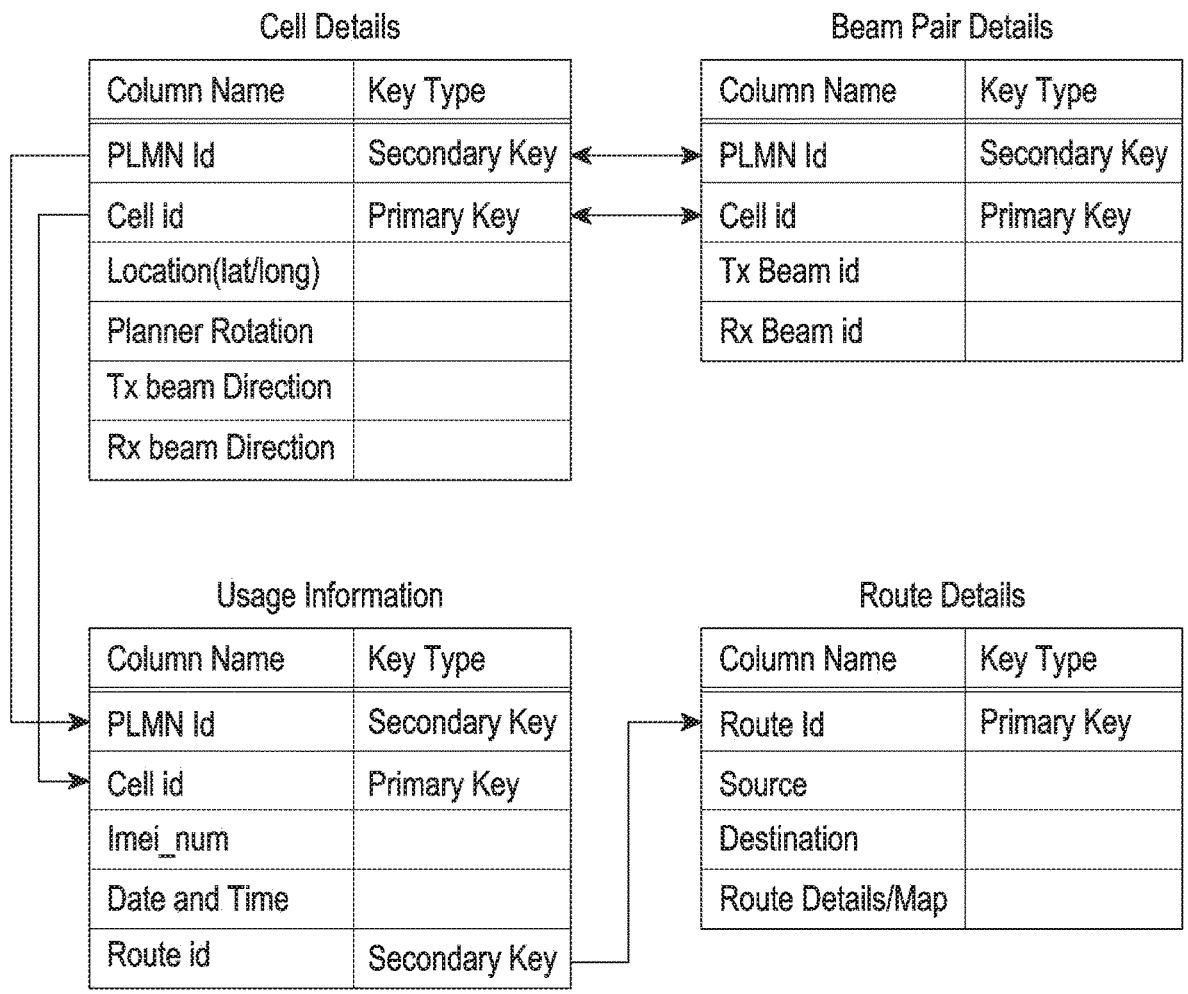
FIG. 13 illustrates a schema of logging beam information within a UE according to an embodiment of the disclosure.

FIG. 13 illustrates a schema for storing Beam Information according to an embodiment of the disclosure.

Referring to FIG. 13, the schema comprises cell details, beam pair details, usage information and route details. The same denotes testing, validation data as a part of machine learning enabled beam learning pursued by the UE as a part of operation 1202.

Figure 14A:
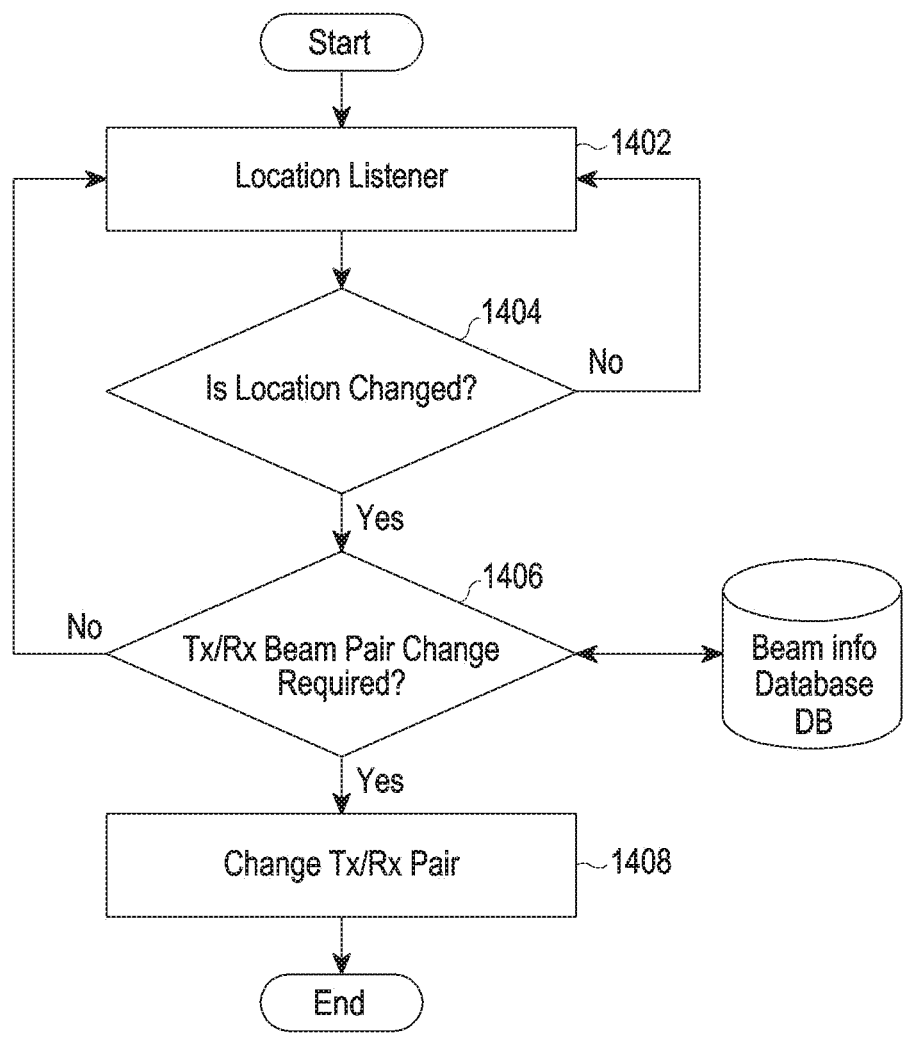
FIGS. 14A and 14B illustrate beam-selections depending on a UE-location according to various embodiments of the disclosure.
Figure 14B:
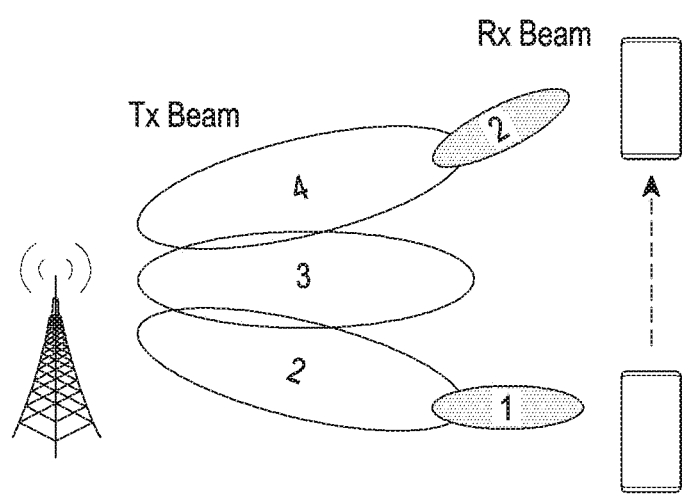

FIGS. 14A and 14B illustrate beam-selections depending on a UE-location according to various embodiments of disclosure.

Referring to FIGS. 14A and 14B, with respect to the current location and based on the accessed beam information, a previously logged position of the UE in three dimensions is compared with a current-position of the UE in three dimensions to thereby determine an angular deviation and causing the switching onto the particular transmission reception beam pair (Tx-Rx).

Referring to FIG. 14A, while the UE is camped on a particular Tx beam based on previous learning information and the UE is moving or routing through a known path, the UE will keep on switching appropriate Tx and Rx beams without performing any exhaustive beam searching.

The UE will have a "location listener" which will monitor location-change information of the UE as depicted in operation 1402. Now if location listener detects any location change of the UE in operation 1404, the UE decides in operation 1406 whether current Tx/Rx beam pair is having RSRP/RSRQ or SINR or the UE needs to switch to a different Tx/Rx pair based on previous learned information, and changes the Tx/Rx pair in operation 1408.

Even the learning information is not available with the UE for that particular location the UE can intuitively predict the Tx/Rx beam direction based on the previous Tx/Rx beam direction, amount of shift from previous location and direction of location shift. Based on that change, different Tx/Rx pair is resorted to. FIG. 14B represents switching to different Tx/Rx pair based on the decision making in FIG. 14A.

Figure 15A:
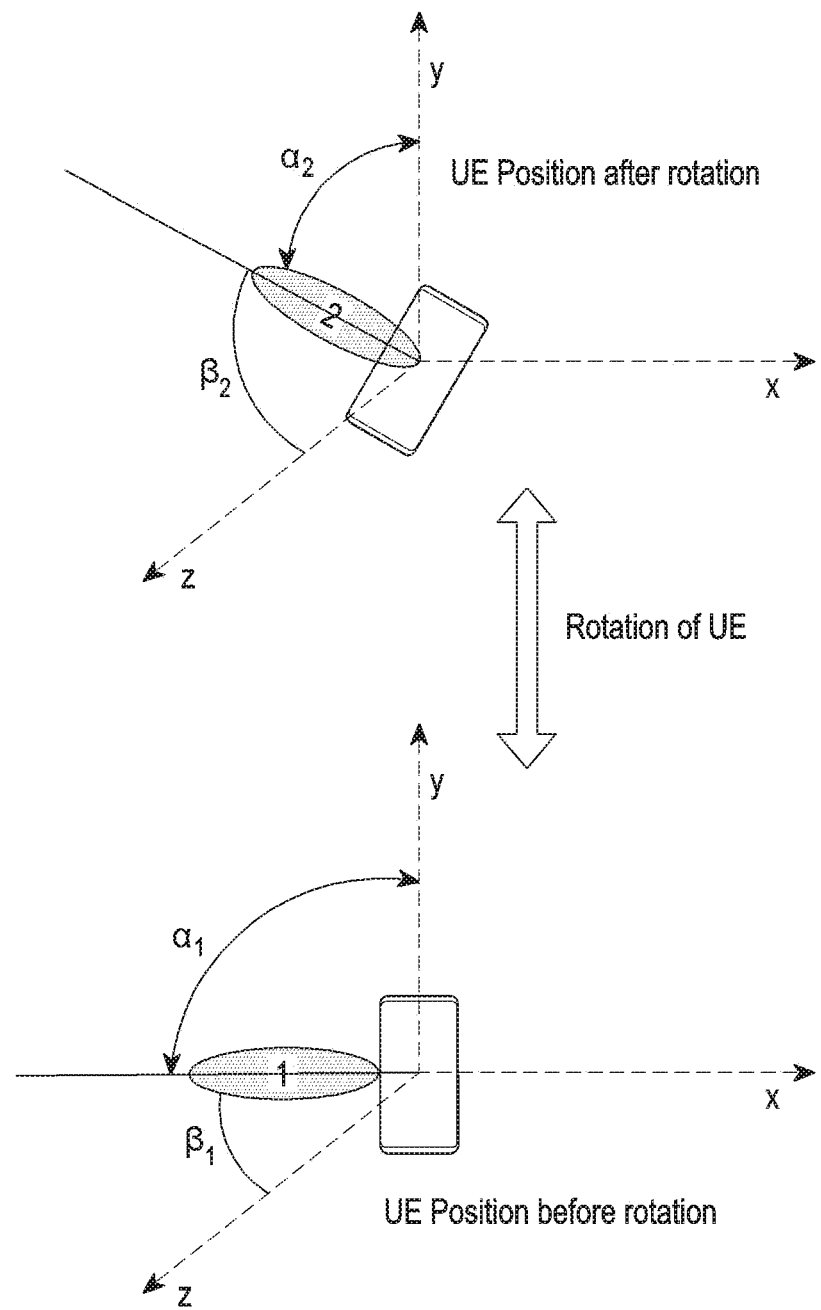
FIGS. 15A and 15B illustrate beam-selections depending on intermediate-blockage according to various embodiments of the disclosure.
Figure 15B:
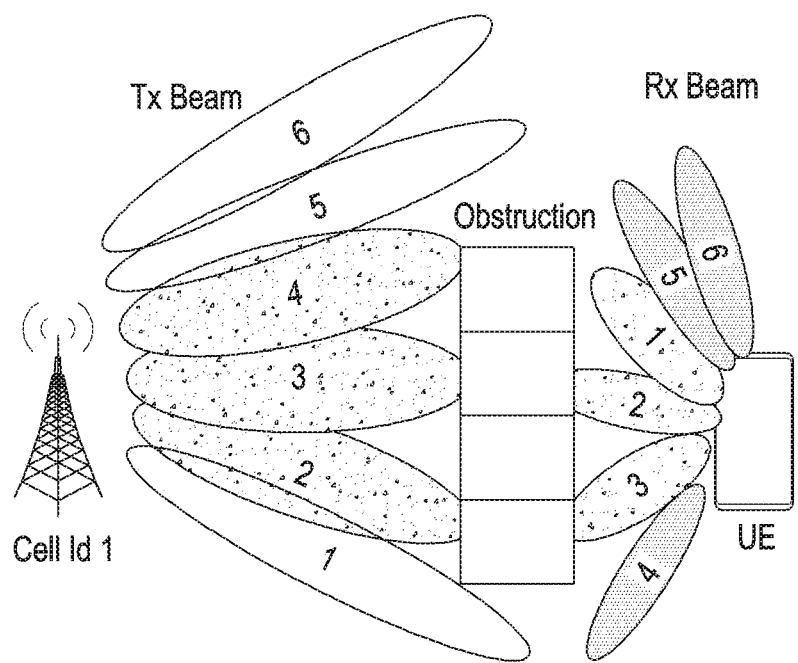

FIGS. 15A and 15B illustrate beam-selections depending on intermediate-blockage according to various embodiments of the disclosure.

Referring to FIGS. 15A and 15B, the beam selection corresponds comprises determining the currently switched Tx/Rx pair as exhibiting temporary or permanent blockage based on detecting underlying RSRP/RSRQ/SINR values. One or more other Tx/Rx pair are searched for further switching by recursively searching in the direction of the currently selected Tx/Rx pair. RSRP/RSRQ or SINR value of the searched Tx/Rx pair are determined as better than currently-selected Tx/Rx pair to thereby enable the further switching on to the searched Tx/Rx pair.

Referring to FIG. 15A, the selection of Tx and Rx beam pair will not only depend upon location of the UE but also upon position of the UE along x, y and z axis. Therefore, even if the UE finds out that the UE has been in the current location earlier (based on learning information as depicted in FIGS. 12A through 13), the UE has to take into account the previous position along x,y and z axis and current x,y and z axis position (i.e., planner rotation along the axis) to figure out the proper Tx/Rx beam pair or at least the beam direction the UE has to perform the beam searching. The same at least reduces the complexity of exhaustive beam search and make the beam switching faster.

From FIG. 15A, it may be seen that selection of Tx and Rx beam will be a function of position of UE along x, y and z axis i.e., $F(\alpha,\beta)$. Accordingly, the UE has to apply relative rotation (i.e., based on previous rotation along x,y and z axis) calculation after it finds out the beam id or beam direction based on current UE location.

In an implementation, it may be possible that Tx or Rx beam may be blocked temporarily or permanently due to some environmental condition or power limitation of either or both of the gNB and the UE. In these cases, the UE tries to find next possible best Tx/Rx beam pair. If the UE finds out that the selected Tx/Rx pair has bad RSRP/RSRQ or SINR values (it signifies that Tx/Rx beam may have temporary or permanent blockage), the UE will try to find best beam pair by recursively searching in both the direction of blocked beams until the UE finds suitable beam pair.

The UE will also monitor the previous selected beam RSRP/RSRQ or SINR values to see if blockage is removed or still persisting. If blockage removed i.e., if the UE finds RSRP/RSRQ or SINR value of the previous selected Tx/Rx beam is better than current camped Tx/Rx beam pair, the UE will camp on the previous selected beam pairs.

In case the UE cannot find the suitable beam pairs the UE will fall back to exhaustive searching after a configured threshold time as per state of the art. In contrast and as explained with respect to FIG. 15B, as Tx beam (2, 3 and 4) and Rx beam (1, 2, 3) are blocked, the UE will search for beam pairs in both direction (i.e., Rx beam 4, 5 and Tx beam 1 and 5 will be measured) recursively until the UE finds suitable beam pair to camp on. For suitable beam pair, the UE will apply a configured RSRP/RSRQ or SINR threshold to prevent exhaustive search. In other example, the UE can also apply binary searching pattern rather than recursive approach. i.e., if the UE finds Tx beam 5 is better than Tx beam 1, the UE will search beam id 6. If it finds beam 5 is better than beam id 6 it will camp on Tx beam id 5.

While the disclosure has been shown and described with reference to various embodiments thereof, it will be understood by those skilled in the art that various changes in form and detail may be made therein without departing from the scope and spirit of the disclosure as defined by the appended claims and their equivalents.

What is claimed is:

1. A method for performing mobility-measurements in new radio (NR) based communication network, the method comprising:
   receiving network information for a plurality of time instances with respect to a geographical area from one or more user equipments (UEs) operating in the geographical area for a predefined duration of time;
   classifying the received network information for the plurality of time-instants as at least one of:
      an NR spectrum availability or an NR spectrum non-availability;
   calculating an overall probability of availability of an NR spectrum within the geographical area based on the classified network information; and
   enabling a UE from amongst a plurality of UEs to schedule NR measurements within the geographical area based on the calculated probability.

2. The method of claim 1, wherein the network information is defined as at least one of:
   a physical cell identifier (PCI) for at least one of a 4th generation (4G) cell and a 5th generation (5G) cell;
   an SIB2 indicator;
   a 5G Cell signal information;
   a UE location;

public land mobile network (PLMN) info;
second cell group (SCG) failure info;
beam information; or
5G cell count in a track area identifier (TAI).

3. The method of claim 1, wherein the classifying of the received network information comprises processing the received network information over a period of time by a server based on a machine-learning criteria to classify a UE location as based on at least one of a 5th generation (5G) network or a 4th generation (4G) network.

4. The method of claim 1, wherein the calculating of the received network information comprises identifying a density of 5th generation (5G) cells in a 4th generation (4G) cell with respect to a UE location based on a clustering-criteria.

5. The method of claim 4, wherein the clustering criteria is defined by classifying the received network information into one or more 5G cell clusters.

6. The method of claim 1, wherein the enabling of the UE from amongst the plurality of UEs to schedule NR measurements comprises:
   communicating the calculated probability with respect to the geographical area to a modem within the UE; and
   adjusting, by the modem, a frequency of scan and gap between consecutive scans with respect to NR measurements based on the calculated probability, the adjusting of the frequency of scan and gap comprising refraining from scanning in case of null probability.

7. The method of claim 1, wherein at least one of the receiving of the network information, the classifying of the received network information, or the calculating of the overall probability is executed by one or more of:
   a mobile management entity (MME) forming a part of the communication network; or
   access and mobile management function (AMF) node forming a part of the communication network.

8. The method of claim 7, wherein the enabling of the UE comprises:
   communicating the calculated probability by at least one of the MME or AMF to the UE for enabling the UE to schedule NR measurements.

9. The method of claim 1, wherein the network information is received, and classified by a network entity.

10. The method of claim 9 further comprising:
    modifying NR measurements configuration parameters and thresholds for at least one UE based on the calculated probability.

11. The method of claim 9, wherein the network entity comprises a 4th generation (4G) core network, a 5th generation (5G) core network, an eNodeB, a gNodeB, and network function blocks.

12. The method of claim 9, wherein at least one of the receiving of network information, the classifying of the received network information, or the calculating the overall probability of availability of the NR spectrum causes a network entity forming a part of a core communication to execute at least one of:
   adjustment of NR measurements configuration parameters and thresholds based on the calculated probability; or
   management of the NR measurement configuration parameters based on the calculated probability.

13. A method for performing mobility-measurements in new radio (NR) based communication network, the method comprising:
   determining new radio (NR) cell locations corresponding to a current location of a mobile-device based on an online-geographical map;
   computing an extent of an NR coverage associated with the current location based on availability of with at least one of a first frequency range (FR1) or a second frequency range (FR2) for telecommunication by a user equipment (UE); and
   enabling the UE at scheduling NR measurements within a geographical area based on ascertaining if the UE is within or nearby the NR coverage.

14. A method for transmission reception ($T_x/R_x$) beam pair selection in 3GPP mobile communication network, the method comprising:
   storing a plurality of beam information with respect to a serving beam by a user equipment (UE) in respect of one or more locations;
   classifying the stored beam information as at least one of:
      cell details, beam pair details, usage information, or route details;
   upon visit to a location by the UE, performing at least one of:
      switching onto a particular transmission reception beam ($T_x/R_x$) beam pair based on the classified beam information; or
      predicting a transmission reception beam direction with respect to the location based on at least one of:
         previous Tx/Rx beam direction;
         an amount of displacement of the UE from previous visited location; or
         a direction of the current location relative to previous location; and
   with respect to the current location and based on the classified beam information, comparing a previously logged position of the UE in three dimensions with a current position of the UE in three dimensions to thereby determine an angular deviation and causing the switching onto the particular transmission reception beam (Tx-Rx) beam pair.

15. The method of claim 14, further comprising:
   determining currently switched Tx/Rx beam pair as exhibiting temporary or permanent blockage based on detecting underlying reference signal receive power (RSRP)/reference signal received quality (RSRQ)/signal-to-interference-plus-noise ration (SINR) values;
   searching one or more other Tx/Rx beam pair for further switching by recursively searching in the direction of the currently determined Tx/Rx beam pair; and
   determining RSRP/RSRQ/SINR value of the searched Tx/Rx beam pair as better than the currently determined Tx/Rx beam pair to thereby enable the further switching on to the searched Tx/Rx beam pair.

16. A server in a telecommunication network for performing mobility-measurements in new radio (NR) based 3GPP mobile communication network, the server comprising:
   a transceiver configured to receive network information with respect to a geographical area from one or more user equipments (UEs) operating in the geographical area for a predefined duration of time; and
   at least one processor configured to:
      classify the received network information at various time-instants during the predefined duration of time as at least one of:
         an NR spectrum availability or an NR spectrum non-availability;
      calculate an overall probability of availability of an NR spectrum within the geographical area for a time-instant subsequent to the predefined duration of time based on the classified network information, and enable a UE at scheduling NR measurements within the geographical area based on the calculated probability.

17. A user equipment (UE) for performing mobility-measurements in new radio (NR) based 3GPP mobile communication network, the UE comprising:
at least one processor configured to:
determine new radio (NR) cell locations corresponding to a current location of a mobile-device at least based on an online-geographical map,
compute an extent of an NR coverage associated with the current location based on availability of with at least one of a first frequency range (FR1) or a second frequency range (FR2) for telecommunication, and
enable a modem at scheduling NR measurements within a geographical area based on ascertaining if the UE is within or nearby the NR coverage.

18. A user equipment (UE) for transmission reception ($T_x/R_x$) beam pair selection in 3GPP mobile communication network, the UE comprising:
a memory configured to store a plurality of beam information with respect to a serving beam by a user equipment (UE) in respect of one or more locations; and
at least one processor configured to:
classify the plurality of beam-information stored as at least one of cell details, beam pair details, usage information, or route details,
upon visit to a location, perform at least one of:
switching onto a particular transmission reception ($T_x/R_x$) beam pair based on the classified beam information; or
predicting a transmission reception beam direction with respect to the location based on at least one of:
a previous Tx/Rx beam direction,
an amount of displacement of the UE from previous visited location, or
a direction of the current location relative to previous location, and
with respect to the current location and based on the classified beam information, compare a previously logged position of the UE in three dimensions with a current position of the UE in three dimensions to thereby determine an angular deviation and causing the switching onto the particular transmission reception (Tx-Rx) beam pair.

19. The UE of claim 18, wherein the at least one processor is further configured to:
determine currently switched Tx/Rx beam pair as exhibiting temporary or permanent blockage based on detecting underlying reference signal receive power (RSRP)/reference signal received quality (RSRQ)/signal-to-interference-plus-noise ration (SINR) values,
search one or more other Tx/Rx beam pair for further switching by recursively searching in the direction of the currently determined Tx/Rx beam pair, and
determine RSRP/RSRQ or SINR value of the searched Tx/Rx beam pair as better than the currently determined Tx/Rx beam pair to thereby enable the further switching on to the searched Tx/Rx beam pair.

* * * * *